United States Patent
Tuppeny, Jr.

[15] 3,685,547
[45] Aug. 22, 1972

[54] INTERNAL CONFIGURATION OF PIPES AND PRESSURE PARTS

[72] Inventor: William H. Tuppeny, Jr., Rockville, Conn.

[73] Assignee: Combustion Engineering, Inc., Windsor, Conn.

[22] Filed: April 28, 1970

[21] Appl. No.: 32,572

[52] U.S. Cl..................................138/178, 138/38
[51] Int. Cl...............................................F16l 9/02
[58] Field of Search..................138/38, 39, 177, 178

[56] References Cited

UNITED STATES PATENTS

| | | | |
|---|---|---|---|
| 3,175,571 | 3/1965 | Bankert | 138/39 X |
| 3,273,599 | 9/1966 | Heeren | 138/38 |
| 2,279,548 | 4/1942 | Bailey | 138/38 X |
| 3,402,767 | 9/1968 | Bohdansky | 138/38 X |

FOREIGN PATENTS OR APPLICATIONS

| | | | |
|---|---|---|---|
| 24,515 | 1895 | Great Britain | 138/38 |

Primary Examiner—Herbert F. Ross
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A metallic pressure part for containing a flowing fluid and offering protection from thermal shock due to temperature changes of the fluid. The inner surface comprises a plurality of lands and furrows with the lands not exceeding 1 ½ inches in any direction. The furrows are one-eighth inch wide and three-eighths inch deep.

12 Claims, 6 Drawing Figures

Patented Aug. 22, 1972

INVENTOR.
W.H. TUPPENY JR.
BY E L Kocher

Patented Aug. 22, 1972

INVENTOR.
W. H. TUPPENY JR.

INTERNAL CONFIGURATION OF PIPES AND PRESSURE PARTS

BACKGROUND OF THE INVENTION

This invention relates to pressure parts such as pipes, tees, and valves for containing a flowing fluid and in particular to an internal surface configuration which offers thermal shock protection from changes in temperature of the fluid flowing through the pressure parts.

Pressure parts containing a flowing fluid suffer thermal shocking when the temperature of the fluid changes rapidly. This becomes significantly severe when the pressure part is of substantial thickness. As the fluid is flowing at a high temperature level, the metallic pipe or fitting assumes a temperature approximately that of the fluid throughout its thickness, particularly where the exterior surface is well insulated.

When the temperature of the fluid rapidly decreases, the internal surface of the pipe is suddenly cooled and tends to contract while the remainder of the pipe temporarily remains at the high temperature level. This in turn introduces high stresses at the internal surface on top of the already existing pressure stresses leading to cracking and failure of the pipe particularly where the thermal shocking phenomenon is repeated many times.

As the temperature of the fluid rapidly increases, the internal surface of the pipe is suddenly heated and tends to expand while the remainder of the pipe temporarily remains at the previous temperature level. This induces high compressive stresses at the internal surface which causes distortion and permanent set of the material. While cracking does not actually occur at this time, the concomitant high tensile stresses established when uniform temperature is again achieved, or on minor temperature decreases, causes the actual cracks to appear. The detrimental thermal shocking therefore, can occur regardless whether the temperature change is one which suddenly increases or decreases.

A cracking of the inner surface known as mud cracking often occurs during such operation. This cracking irregularly forms along the weakest grain boundaries, is sometimes triangular in shape, and has the general appearance of the type of cracking that generally occurs in dried up lakes. This mud cracking affords some protection against further cracking, however, the general appearance creates a definite lack of confidence in the integrity of the pressure part. These mud cracks further cut into the base material which is needed for strength in retaining the fluid under pressure. The cracks occur to an unknown depth and are of a very narrow, irregular form. They, therefore, present a location for corrosive products to gather thereby increasing corrosion problems and stress corrosion problems.

SUMMARY OF THE INVENTION

The internal surface of a pressure part is provided with a plurality of lands and furrows. The lands are limited to 1½ inches in any direction measured along the internal surface of the pressure part. The furrows are preferably three-eighths inch deep. These lands are capable of absorbing thermal shock due to a rapid change of the temperature of the flowing fluid without detrimental cracking. The furrow width preferably is about one eighth inch, with the maximum width being about one fourth inch. Wider furrows would cause a loss of protection against thermal shocking of the material at the base of the furrow while substantially narrower furrows lead to build up of corrosion products, along with the inability for them to be inherently washed out.

The use of a known pattern forces the stress concentrations in preselected areas so that cracks will not inherently occur at the weakest boundries. The known depth of the furrows facilitates strength design with confidence.

DESCRIPTION OF THE PREFERRED EMBODIMENT

Figure 1:
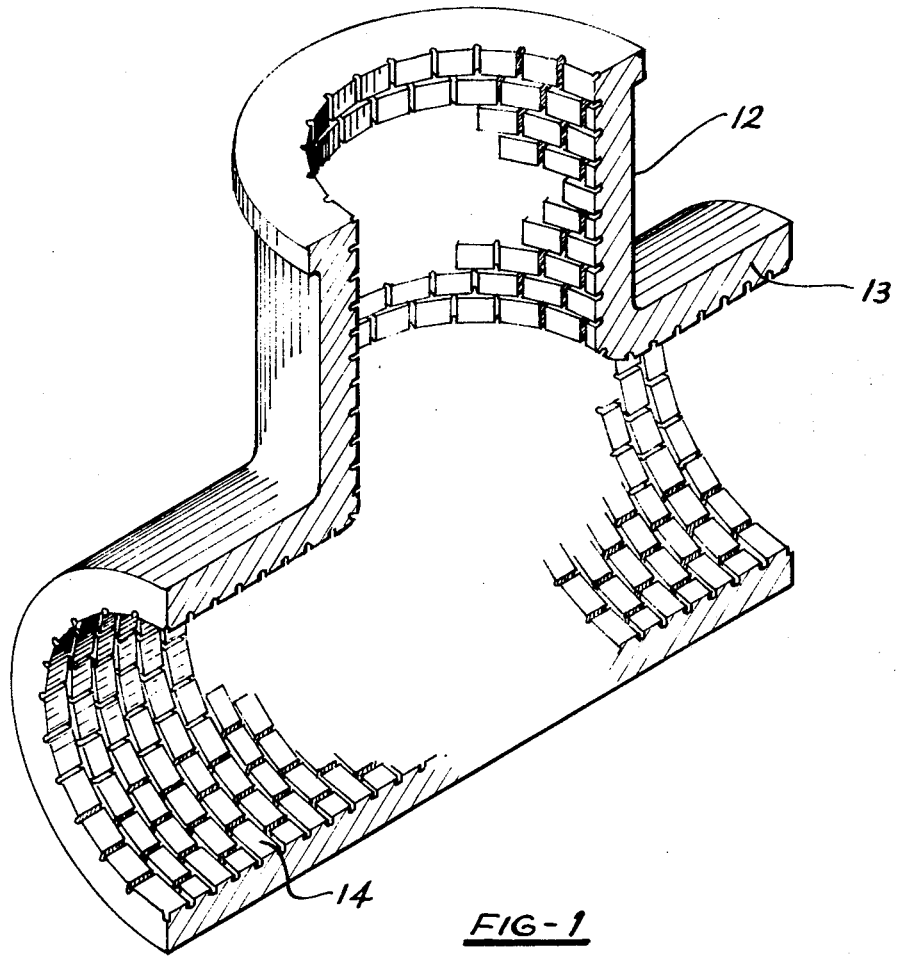
FIG. 1 is a sectional isometric view of a pipe tee illustrating the internal surface configuration.
Figure 3:
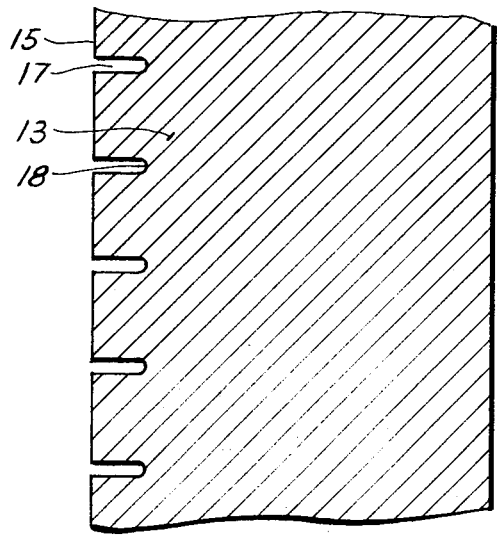
FIG. 3 is a sectional view through the pipe wall of FIG. 2.
Figure 5:
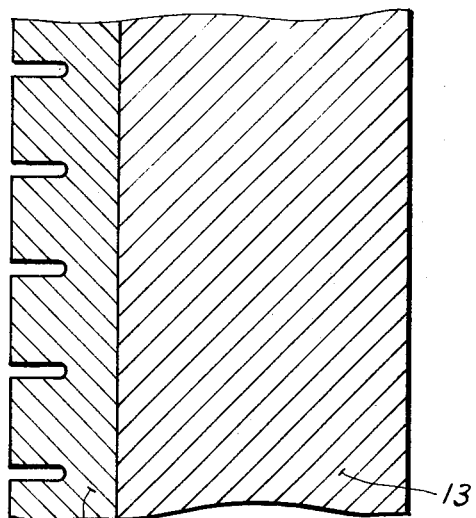
FIG. 5 illustrates the lands applied as cladding.

FIG. 1 illustrates a pipe tee 12 including a thick metallic pressure retaining wall 13 approximately 3 inches thick. While the particular pressure part illustrated is a pipe tee, the invention is equally applicable to pipes or to fittings generally. A flow of variable temperature fluid passes through the tee. The particular direction of flow is not significant in my invention since the invention deals with the internal configuration of the pipe to avoid inordinate thermal shock in the event of sudden change of temperature of the fluid passing through the tee.

The internal surface 14 of the tee has a plurality of rectangular lands 15 of the surface. As measured along the inner surface no dimension of the land exceeds 1½ inches. For a rectangular land such as that illustrated in FIG. 2 this dimension would be the diagonal of the rectangle. The pattern illustrated in that figure shows lands which are 1¼ inches long and three-fourths inch wide. The 1½ inch dimension is the maximum recommended based on observations of mud cracking patterns. The ratio of the length and width, i.e. the major dimensions should not exceed 3, since this would increase the fabrication requirements without any additional thermal shock protection being gained.

These lands are separated by furrows 17 which are machined in the metallic wall. These furrows are approximately three eighths of an inch deep and of a width of approximately one fourth inch. The root 18 of the furrow is rounded with a 1/16 inch radius to minimize any stress concentrations occuring at the base of the furrows. In the event of a sudden temperature change in the fluid passing through the tee, the inner surface of the land contacting the fluid changes temperature first, contracting or expanding depending on the direction of the the temperature change. Distortion takes place throughout the height of the land with the sizing being selected as described so that the strain is insufficient to form and propagate detrimental cracks. Due to the narrowness of the furrows, the temperature change does not occur as rapidly at the root 18 of the furrow thereby avoiding excessive thermal shocking at that location. The furrow is sufficiently wide to avoid the build up of corrosion producing material which can become highly concentrated in a narrow crack. Even if the material is not washed away from the crack, it may be of a nature such as to have very low shear strength and, therefore, does not interfere with the proper operation of the lands.

Instead of machining the furrows into the base metal, the lands could alternately be built up by depositing weld metal on the base by any one of well known methods of welding. The inner surface including the lands and furrows can be made separate from the body of the tee as cladding 19 and bonded to the tee by explosive forming or any other method which would result in a reasonably solid contact between the two components so as to avoid any vibration of the lining. This approach would be particularly adaptable for use in systems where ferritic piping is used while an austenitic inner lining is required.

Figure 2:
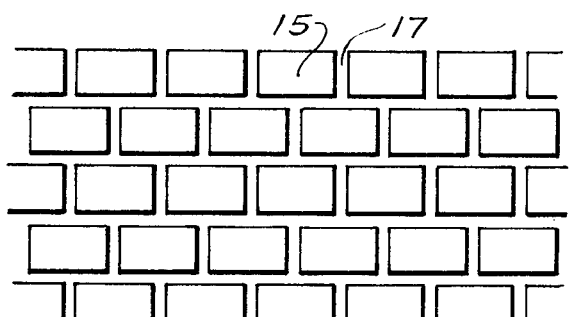
FIG. 2 is a plan view of a rectangular pattern of lands which are staggered.
Figure 4:
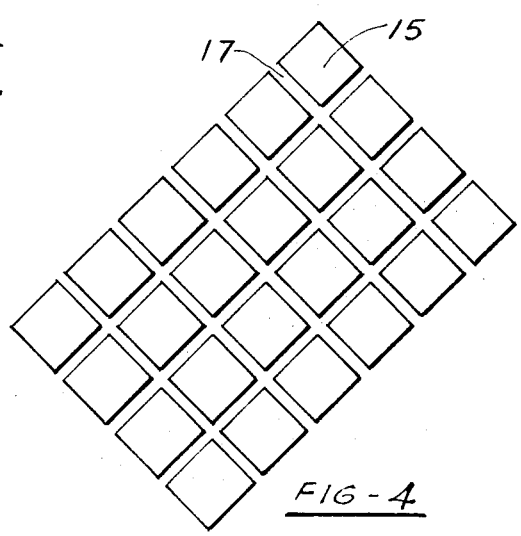
FIG. 4 illustrates rectangular lands which are in line.

While FIG. 2 illustrates a staggered arrangement of lands, FIG. 4 illustrates an in line arrangement where the surfaces are formed of 1 inch squares. The maximum dimension of these lands is about 1.4 inch thereby staying within the requirement of $1_{1/2}$ inches maximum dimension.

Figure 6:
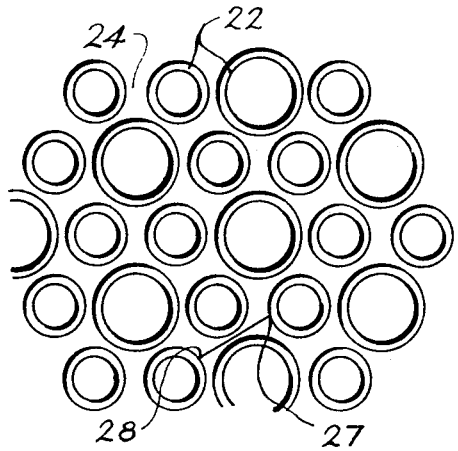
FIG. 6 illustrates an arrangement of lands formed by cutting circular furrows.

FIG. 6 illustrates still another method of producing the lands on the inner surface. Annular furrows 22 are cut into the internal surface of the pipe resulting in circular lands 23 and an irregular land 24. The maximum dimensions on the irregular land is limited to 1½ inches this being the distance between point 27 and point 28. Obviously the maximum dimension on the circular lands 23 is well below this 1½ inch limit.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the purview of my invention.

What is claimed is:

1. Apparatus for conducting fluids subject to periodic temperature changes including a hollow, metallic body of a thickness imposing significant thermal gradients between its inner and outer surfaces upon the occurrence of a change in temperature in the conducted fluid, the improvement comprising an array of mutually intercepting furrows disposed throughout the inner surface of said body defining closely spaced lands, said inner surface being flat in axial section, said furrows being arranged such that an axial section taken through said inner surface has a castellated configuration in which each of said lands has at least three sides; and the maximum uninterrupted linear dimension measured along said inner surface between furrows is not greater than about 1.5 inches.

2. An apparatus as in claim 1 wherein the maximum width of the furrows separating the lands is one-fourth inch.

3. An apparatus as in claim 1 wherein the radially inwardly facing surface of each land is rectangular in shape.

4. An apparatus as in claim 3 wherein the ratio of the major dimensions of the inwardly facing surface of each land does not exceed 3.

5. An apparatus as in claim 1 wherein the depth of the furrows is approximately three-eighths of an inch.

6. An apparatus as in claim 1 wherein said lands are defined by machined furrows in the metal of the wall of the hollow body.

7. An apparatus as in claim 1 wherein said hollow body includes a layer of cladding material bonded to the interior surface thereof and wherein said land-defining furrows are disposed in said cladding material.

8. An apparatus as in claim 1 wherein the bottom of the furrows are rounded.

9. An apparatus as in claim 8 wherein the radius of the bottom of said furrows has a dimension at least one-half the width of the furrows.

10. An apparatus as in claim 3 wherein the depth of the furrows is approximately three-eighths of an inch.

11. An apparatus as in claim 10 wherein the bottom of the furrows are rounded.

12. An apparatus as in claim 11 wherein the radius of the bottom of said furrows has a dimension at least one-half the width of the furrows.

* * * * *